July 15, 1969     J. G. GEBHARDT     3,455,254
DISMOUNTABLE DOUGH RING FORMING DEVICE
Filed Oct. 9, 1967
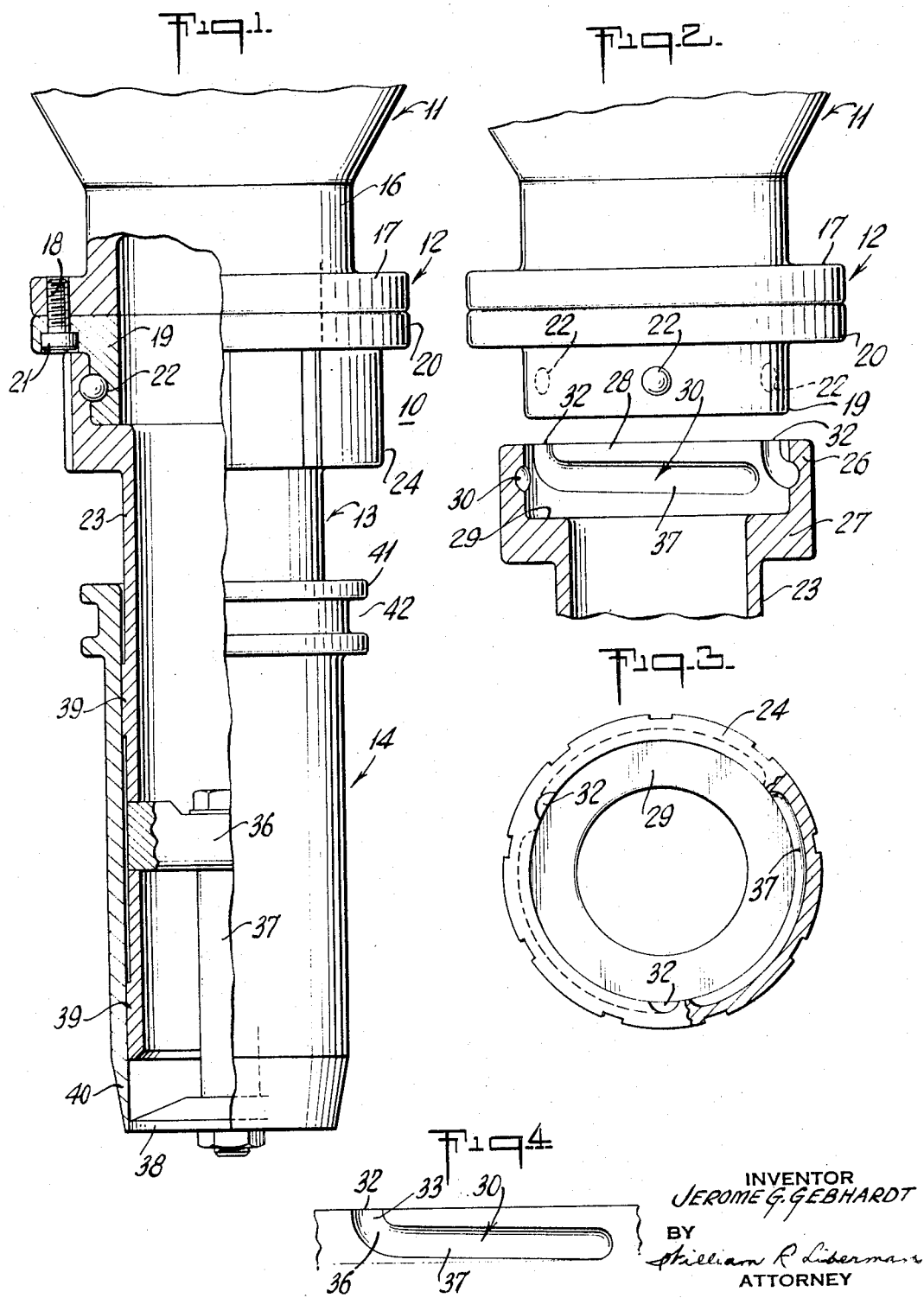
INVENTOR
JEROME G. GEBHARDT
BY
William R. Lieberman
ATTORNEY & # United States Patent Office 3,455,254
Patented July 15, 1969

3,455,254
DISMOUNTABLE DOUGH RING
FORMING DEVICE
Jerome G. Gebhardt, Catonsville, Md., assignor to DCA
Food Industries Inc., New York, N.Y., a corporation
of New York
Filed Oct. 9, 1967, Ser. No. 673,682
Int. Cl. A21c 3/04, 11/16
U.S. Cl. 107—14                                    7 Claims

ABSTRACT OF THE DISCLOSURE

A dough ring former includes a dough hopper provided with a bottom coupling sleeve having an outer cylindrical face which has formed therein three circumferentially spaced arcuate concave recesses supporting inwardly projecting ball detents. A nozzle is provided at its top with a coupling collar having an inner cylindrical face slidably engaging the coupling sleeve and provided with three helical grooves engaging the detents and having a pitch which decreases with distance from the upper edge of the collar. In coupled position the sleeve lower edge engages a shoulder at the bottom of the collar-inner face.

Background of the invention

The present invention relates generally to improvements in apparatus for the production of shaped dough pieces, and it relates particularly to an improved apparatus for the formation of toroidal dough pieces for the production of doughnuts.

An apparatus commonly employed in the formation of toriodally shaped dough pieces attendant to the production of doughnuts comprises a hopper containing dough under pressure and provided with a depending vertical cylindrical nozzle below which is positioned a coaxial valve disc. A cutter sleeve is reciprocated on the nozzle upwardly to open the nozzle and effect the radial extrusion of dough when the sleeve is above the valve disc and then downwardly into engagement with the disc to sever a dough ring from the nozzle and close the latter. While the dough ring forming mechanism of the above nature is usually highly satisfactory it possesses numerous drawbacks and disadvantages. The conventional mechanism is frequently difficult to service and maintain and is of little versatility and adaptability and otherwise leaves much to be desired. The dough extrusion and severing mechanism is so associated with the apparatus that its mounting, dismounting and replacement is highly time consuming and requires a considerable degree of skill. Accordingly, the changing of the dough forming mechanism for servicing or replacement with a similar or differently sized or shaped mechanism results in a high apparatus down time and presents other problems.

Summary of the invention

A principal object of the present invention is provide an improved apparatus for the production of shaped dough pieces.

Another object of the present invention is to provide an improved apparatus for the production of dough rings.

Still another object of the present invention is to provide a rapidly easily replaceable dough ring forming mechanism.

A further object of the present invention is to provide a dough ring producing mechanism of the above nature characterized by its simplicity, ruggedness, reliability, versatility and adaptability.

The above and other objects of the present inpention will become apparent from a reading of the following description taken in conjunction with the accompanying drawing which illustrates a preferred embodiment thereof.

In a sense, the present invention contemplates the provision of an apparatus for extruding and cutting pieces of dough comprising a source of dough under pressure including a downwardly directed outlet having a first coupling member affixed in registry therewith, an extrusion nozzle having affixed thereto a second coupling member separably matingly engaging said first coupling member, and means for severing the dough extruded through said nozzle, said coupling members having slidably engageable coaxial first and second cylindrical faces, said first face being provided with a plurality of circumferentially spaced circumferentially and axially extending grooves having entrances at an outer edge of said corresponding coupling member and the other coupling member being provided with detents directed outwardly from said second face and slidably registering with said grooves, said grooves being provided with camming faces for releasably tightly locking said coupling members in a mutually coupled condition.

According to a referred form of the improved apparatus, the second coupling member comprises a collar affixed to the upper end of the nozzle and having a cylindrical inner face provided along its bottom with an upwardly facing annular shoulder. There are three coupling channels of arcuate cross-section formed in the collar inner face and extend helically from the upper edge thereof at a progressively decreasing pitch at least along a portion thereof. The first coupling member comprises a cylindrical ring or sleeve affixed to the lower end of the hopper, the sleeve having three circumferentially equally spaced arcuate recesses which retain outwardly projecting ball detents which releasably engage the coupling grooves. A disc is supported coaxial with and below the nozzle and a reciprocating outer sleeve engages the nozzle.

The improved dough ring producing mechanism may be easily and rapidly mounted and dismounted thereby facilitating its replacement and the versatility and usefulness of the associated apparatus.

Brief description of the drawing

FIGURE 1 is a front elevational view partially in section, of a mechanism embodying the present invention illustrated in a coupled condition;

FIGURE 2 is a fragmentary view similar to FIGURE 1 with the mechanism illustrated in an uncoupled condition;

FIGURE 3 is a top plan view, partially in transverse section, of the nozzle member; and FIGURE 4 is a developed fragmentary front elevational view of the nozzle coupled member.

Description of the preferred embodiment

Referring now to the drawing which illustrates a preferred embodiment of the present invention, as applied to the extension and severing of dough rings, the reference numeral 10 generally designates the improved mechanism which includes a dough hopper 11, an upper coupling member 12, a nozzle member 13 and a cutting sleeve 14. The hopper 11 is provided with a depending short outlet tube 16 terminating at its lower end in an outwardly directed horizontal peripheral flange 17 provided with a plurality of regularly circumferentially spaced tapped vertical bores 18.

The upper coupling member 12 comprises a vertical sleeve or collar 19 with an inside diameter approximately equal to that of the outlet tube 16 and provided at its top with an outwardly directed peripheral flange 20 having vertical counterbored openings registering with the tapped openings 18. The coupling member 12 is affixed to the flange 17 by screws 21 registering with the counterbored flange openings and engaging the tapped bores 18. Formed in the outer face of the collar 19 medially between its lower edge and the flange 20 are three equally circumferentially spaced semispherical recesses in which are nested steel ball detents 22 which project inwardly of the inner face of the collar 19 and are retained in the recesses in any suitable manner such as by the inward upsetting or peening of the borders surrounding the recesses.

The nozzle member 13 includes a lower nozzle section 23 and an integrally formed upper coupling member 24. The coupling member 24 comprises a vertical collar 26 connected to the nozzle section by an annular shoulder portion 27. The collar 27 has a cylindrical inner face 28 substantially complementing the outer face of the collar 19 so as to be slidably rotatably engageable therewith, the bottom of the inner face being delineated by an upwardly facing annular shoulder 29. The height of the collar face 28 is approximately equal to that of the collar 19.

Formed in the collar inner face 28 are three circumferentially equally spaced, similar modified bayonette type grooves 30 having a substantially semicircular transverse cross-sections complementing that of the ball detents 22. Each of the grooves 30 extends to the upper edge of the collar 26 to provide an end access opening 32 to each groove 30. The leading section 33 of the groove 30 proximate end opening 32 initially extends a short distance vertically or axially downwardly from the end opening 32 and then gradually curves along an elbow shaped path 36 into a helical section 37 defining the major extent of the groove 30. The groove section 37 has a small helical pitch which may be uniform or may gradually decrease approaching the trailing or closed inner end of the groove 30 and the elbow section 36 is helical along at least its trailing portion proximate the section 37 with a decreasing pitch as it approaches its leading end. The outer face of the collar 26 is vertically splined to facilitate the use of a tightening and uncoupling tool, if desired.

The nozzle section 23 coaxially depends from the shoulder section 27 and has an inside diameter somewhat less than that of the collar 19. A transverse bridge member or bar 36 is mounted in the nozzle section 23 above its bottom outlet opening and supports a rod which depends coaxially below the bottom edge of the nozzle section 23. Suitably mounted to the bottom of the rod 27 is a cutter disc 38 of known configuration having an outside diameter equal to that of the nozzle section 23. The nozzle section 23 is provided with slightly raised vertically spaced upper and lower peripheral portions 39 which define slide bearing surfaces.

The cutter sleeve 14 slidably engages the nozzle section 23 and is provided with a bottom cutting edge 40 and an enlarged upper annular head 41 provided with a peripheral groove 42. The groove 42 is engaged in the known manner by a vertically rockable yoke which reciprocates the cutter sleeve 14 between a depressed position engaging the disc 38 and a raised position at about the level of the bottom of the nozzle 13.

In coupling the nozzle 13 to the hopper 11 the coupling collar 26 is raised into engagement with the collar 19, turned with an upward pressure, clockwise as viewed from below, until a tight coupling is effected. When the access openings 32 reach the detents 22 the nozzle 13 will move upwardly so that the detents engage the grooves 30 and further rotation of the nozzle 13 causes the detents 22 which ride along the inclined grooves 30 to raise the nozzle 13. When the shoulder 29 reaches the bottom edge of the collar 19 the small pitch sections of the grooves 30 are engaged by the detents 22 so that a great mechanical advantage is achieved to effect a tight fluid tight engagement between the shoulder 29 and the bottom of the collar 19 with a very small applied torque. The nozzle 13 may be rapidly uncoupled merely by turning it counterclockwise.

While there has been described and illustrated a preferred embodiment of the present invention, it is apparent that numerous alterations, omissions and additions may be made without departing from the spirit thereof. For example, although the hopper 11 is illustrated as provided with only one coupling member 12 and associated nozzle 13, the hopper may be provided in any suitable manner with a plurality of coupling members 12 and nozzles 13.

I claim:

1. An apparatus for extruding and cutting pieces of dough comprising a source of dough under pressure including a downwardly directed outlet having a first coupling member affixed in registry therewith, an extrusion nozzle having affixed thereto a second coupling member separably matingly engaging said first coupling member, and means for severing the dough extruding through said nozzle, said coupling members having mutually slidably engageable, coaxial first and second cylindrical faces, said second face being provided with a plurality of circumferentially spaced and axially extending grooves having entrances at the outer edge of said corresponding coupling member and the outer coupling member being provided with detents directed outwardly from said first face and slidably registering with said grooves, said grooves being provided with camming faces for releasably tightly locking said coupling members in a mutually coupled condition and each of said grooves including a helical section of a pitch decreasing along the length thereof with an increase in distance from said groove entrance.

2. The apparatus of claim 1, wherein said second coupling member comprises a collar having an inner face defining said second cylindrical face, said second face terminating at its lower end in an inwardly directed upwardly facing annular shoulder, said grooves extending from the upper edge of said collar and traversing said helical paths decreasing in pitch with increasing distance from said upper edge.

3. The apparatus of claim 2, wherein said first coupling member comprises a tubular section with an outer face defining said first face, said detents being spaced from the lower edge of said tubular section a distance greater than the distance between the bottom sections of said grooves and said shoulder.

4. The apparatus of claim 1, wherein said second coupling member comprises a collar having an inner face defining said second cylindrical face, said second face terminating at its lower end in an inwardly directed upwardly facing annular shoulder, said grooves extending from the upper edge of said collar and traversing said helical paths decreasing in pitch with increasing distance from said upper edge and said first coupling member comprises a tubular section with an outer face defining said first face, said detents being spaced from the lower edge of said tubular section a distance greater than the distance between the bottom sections of said grooves and said shoulder.

5. The apparatus of claim 4, wherein said first face has arcuate concave recesses formed therein, said detents comprising balls engaging said recesses.

6. The apparatus of claim 4, wherein said first face has arcuate concave recesses formed therein, said detents comprising balls engaging said recesses, and said grooves are of arcuate transverse cross-section.

7. The apparatus of claim 4, including a disc supported coaxially below said nozzle, said dough severing means comprising a sleeve vertically slidably engaging said nozzle and moving between positions above said disc and in engagement with said disc.

References Cited

UNITED STATES PATENTS

| 1,549,858 | 8/1925 | Evans | 222—568 |
| 2,244,854 | 6/1941 | Sandin | 107—14.8 |
| 2,449,659 | 9/1948 | Lane | 285—361 XR |
| 3,317,220 | 5/1967 | Bruning | 285—276 |
| 1,762,065 | 6/1930 | Lally | 285—33 |

FOREIGN PATENTS 1,139,946  11/1962  Germany.

WILLIAM I. PRINCE, Primary Examiner

ARTHUR O. HENDERSON, Assistant Examiner